(12) United States Patent  
Soto et al.

(10) Patent No.: US 8,337,036 B2
(45) Date of Patent: Dec. 25, 2012

(54) SHROUD PLATE WITH LIGHTING SYSTEM

(75) Inventors: Ronald R. Soto, Laguna Hills, CA (US); Jonathon R. Prendergast, Newport Beach, CA (US); Charles Royston Patton, III, Murrieta, CA (US)

(73) Assignee: Norotos, Inc., Santa Ana, CA (US)

( * ) Notice: Subject to any disclaimer, the term of this patent is extended or adjusted under 35 U.S.C. 154(b) by 273 days.

(21) Appl. No.: 12/770,671

(22) Filed: Apr. 29, 2010

(65) Prior Publication Data

US 2011/0170280 A1 Jul. 14, 2011

Related U.S. Application Data

(60) Provisional application No. 61/173,964, filed on Apr. 29, 2009.

(51) Int. Cl.
*F21V 21/084* (2006.01)
(52) U.S. Cl. .......................... 362/105; 362/103; 362/106
(58) Field of Classification Search .................. 362/103, 362/106, 105
See application file for complete search history.

(56) References Cited

U.S. PATENT DOCUMENTS

| | | | |
|---|---|---|---|
| 5,683,831 A | 11/1997 | Baril et al. | |
| 6,751,810 B1 | 6/2004 | Prendergast | |
| 7,128,434 B1 * | 10/2006 | Nally et al. | 362/105 |
| 7,192,151 B2 * | 3/2007 | Clupper et al. | 362/105 |
| 7,219,370 B1 | 5/2007 | Teetzel et al. | |
| 7,303,023 B2 * | 12/2007 | Harrall et al. | 166/384 |
| 7,722,205 B2 * | 5/2010 | Kim | 362/106 |
| 7,901,104 B2 * | 3/2011 | McLean et al. | 362/106 |
| 2007/0012830 A1 | 1/2007 | Prendergast | |
| 2007/0159810 A1 | 7/2007 | Kim | |
| 2008/0055887 A1 | 3/2008 | Cheng | |
| 2008/0301845 A1 * | 12/2008 | Boulan | 2/5 |
| 2009/0083890 A1 | 4/2009 | Dempsey et al. | |

* cited by examiner

*Primary Examiner* — Anabel Ton
(74) *Attorney, Agent, or Firm* — Christie, Parker & Hale, LLP

(57) ABSTRACT

A light for headgear includes a shroud plate having a shell configured to receive a goggle mount, the shell having a periphery generally conforming to a contour of the headgear; and a lighting system on the shell having at least one light. The light further includes a power unit electrically coupled to the lighting system.

20 Claims, 9 Drawing Sheets

SHROUD PLATE WITH LIGHTING SYSTEM

CROSS-REFERENCE TO RELATED APPLICATION

This application claims the benefit of U.S. Provisional Application No. 61/173,964, filed Apr. 29, 2009, in the U.S. Patent and Trademark Office, the entire disclosure of which is incorporated herein by reference.

BACKGROUND

Night vision goggles are commonly used by military personnel for conducting operations in low light or night conditions. Assemblies for mounting night vision goggles to a helmet or other headgear are well known in the art. These mounting assemblies allow a user's hands to remain free while viewing a scene through the night vision goggles.

Although previous mounts exist that allow for a hands-free configuration, such mounts may have edges, corners or other configurations that may snag on certain objects, such as a shroud line of a parachute or a tree branch, and thereby cause a wearer's head to jerk in an undesired direction and with a large force, or in the case of a shroud line, cut the line entirely and thereby endanger a wearer descending with a parachute.

Further, under certain circumstances, it may be desirable for military personnel to have access to a light source when use of the night vision goggles is unnecessary or not practical, or to have access to a light source in addition to the use of night vision goggles. Particularly, because depth perception is often difficult to calculate when using night vision goggles, a readily-available and hands-free light source that allows a person to perform tasks without the use of night vision goggles under low light conditions is useful.

SUMMARY

According to one embodiment, a light for headgear includes a shroud plate having a shell configured to receive a goggle mount, the shell having a periphery generally conforming to a contour of the headgear; and a lighting system on the shell comprising at least one light; and a power unit electrically coupled to the lighting system.

In one embodiment, the shroud plate has a smooth external surface. Further, the shell may be a single unit and the lighting system may be a single unit, and the lighting system may be removably coupled to the shell. Additionally, the power unit may be removably coupled to the shroud plate.

The lighting system may include a support plate comprising a control system for controlling the lighting system and at least one light housing accommodating the at least one light and coupled to the support plate. Additionally, the lighting system may also include a power switch mounted on the support plate and electrically coupled to the control system for turning the lighting system on and off and a dimming switch mounted on the support plate and electrically coupled to the control system for controlling an intensity of light emitted from the lighting system.

The shell may have a plurality of openings, each of the openings configured to receive a portion of the lighting system and the lighting system may be coupled to the shell by an interference fit.

In one embodiment, the shell has a goggle mount receiving area defined by a first wall having a recess and a second wall having a recess. Further, the shell has a back surface generally facing the headgear and wherein the back surface may have an elastic lining configured to contact the headgear. Additionally, the lighting system may include a plurality of lights, a first light adjacent to a first side of the goggle mount receiving area and an additional light adjacent to a second side of the goggle mount receiving area. Further, the lighting system may include at least one light housing accommodating the at least one light, the light housing configured to direct light emitted from the at least one light in a direction substantially away from the headgear.

BRIEF DESCRIPTION OF THE DRAWINGS

FIG. 9 is a perspective view of a fastening system for a battery pack according to an embodiment of the present invention.

DETAILED DESCRIPTION

Embodiments of the present invention are directed to a shroud plate for attaching night vision goggles to headgear, such as a helmet, the shroud plate having a lighting system to provide a user with a hands-free, adjustable light to be used instead of or simultaneously with night vision goggles. As described in more detail below, the shroud plate with the lighting system has a relatively low profile that generally matches a contour of a user's headgear so that the shroud plate does not have any edges on which another object, such as a shroud line of a parachute or a tree branch, can easily snag and force the headgear in a direction that may injure the wearer.

Figure 1:
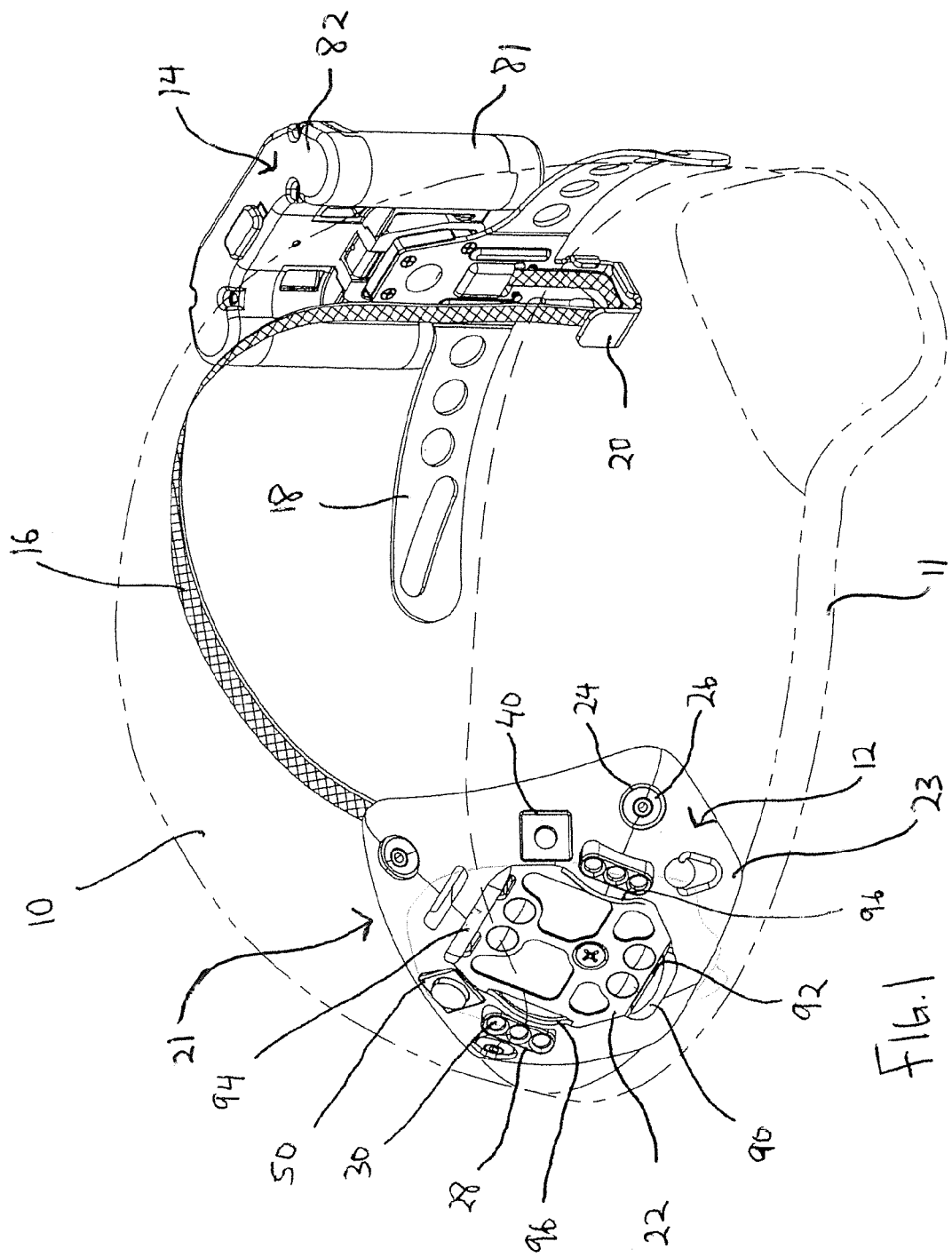
FIG. 1 is a perspective view of a shroud plate having a lighting system according to an of the present invention.

With reference to FIG. 1, in one embodiment, a shroud plate 12 is attached to headgear 10 in the form of a helmet. The shroud plate may be similar to the shroud plates described in U.S. Pat. No. 6,751,810, filed Mar. 13, 2003, the entire disclosure of which is incorporated herein by reference. However, it will be appreciated that various different shroud plates may be used and that the shroud plate may be attached to any one of a number of different types of headgear as necessary for a specific application.

A power unit 14 is attached to the headgear 10 and is electrically connected to the lighting system to provide power to the system. In one embodiment, the power unit 14 is a battery pack attached to a back of the headgear 10 generally opposite to the shroud plate 12 attached to a front of the headgear, the power unit being connected to the lighting system by a cable 16 that extends along an interior of the headgear. The power unit 14 is attached generally opposite to the shroud plate 12 and can act as a balancing counterweight to the shroud plate 12, and to the night vision goggle when one is attached thereto, to provide a center of gravity more towards a center of a wearer's head.

As shown in FIG. 1, the power unit 14 includes a case 81 having a top opening and adapted to contain a power source, such as batteries, and a cover 82 covering the top opening. In one embodiment, the case 81 is adapted to contain four AA alkaline batteries, but as will be appreciated, the case 81 and the cover 82 are not limited to the size and configuration shown in FIG. 1.

In one embodiment as shown in FIG. 1, the power unit 14 is mounted to the headgear 12 by a hot shoe bracket or power unit bracket 18, as described in more detail in U.S. application Ser. No. 11/859,689, filed Sep. 21, 2007, the entire disclosure of which is incorporated herein by reference. The bracket 18 is attached to the headgear 10 by fasteners and includes a cable support 20 that protects the cable 16 and guides the cable around a rim of the headgear. Although the power unit 14 is shown to be attached to the headgear 10 by the bracket 18, it will be appreciated that the power unit 14 can be attached to the headgear by any sufficient fastener. For instance, the power unit 14 and/or the shroud plate 12 may be attached to a bracket having arms adapted to wrap around the brim of the headgear 10 and the cable may extend along an exterior of the headgear, thereby allowing for simple removal of the system from one headgear and simple attachment to a second headgear.

The shroud plate 12 allows night vision goggles attached to a night vision goggle mount to be attached to the headgear 10. Exemplary embodiments of night vision goggle mounts that may be used are described in U.S. application Ser. No. 11/473,495, filed on Jun. 23, 2006, the entire disclosure of which is incorporated herein by reference, although any appropriate night vision goggle mount may be used.

The shroud plate 12 is contoured to generally conform to a contour of the headgear 10 and to provide a dock for night vision goggles. The shroud plate 12 has a minimal profile and a smooth surface for avoiding interference with equipment, such as a parachute line, or objects, such as foliage, that may be encountered by the headgear wearer. As defined herein, the term smooth means that the entire external surface has no projections on which an object, such as a shroud line or foliage, can catch and interfere with the headgear 10. Due to the low profile and the smooth surface of a shell 21 of the shroud plate 12 with or without the lighting system coupled thereto, objects can slide over the shroud plate without snagging and forcing or jerking the shroud plate and the attached headgear in an undesirable direction that may injure the user.

Figure 2:
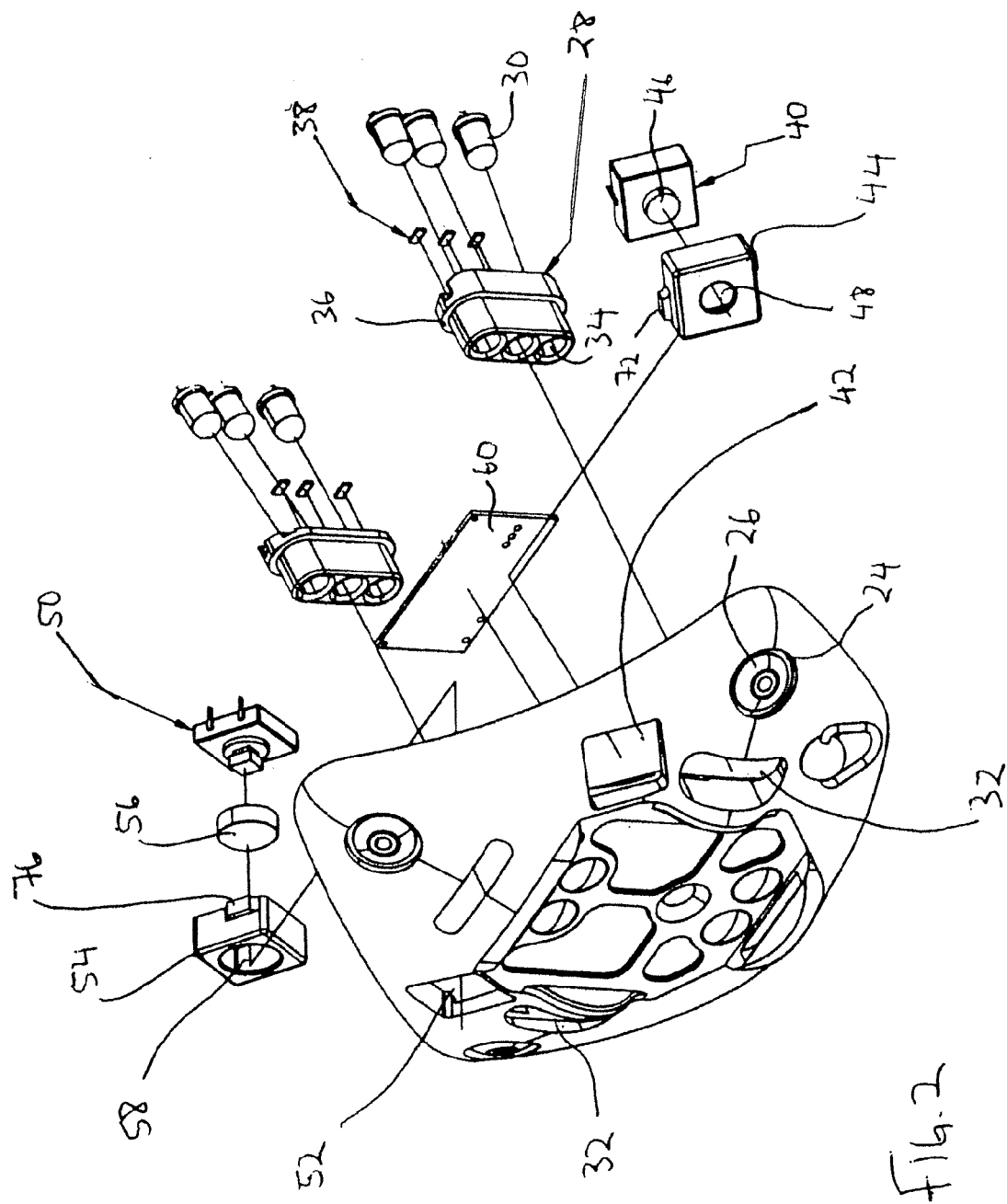
FIG. 2 is an exploded perspective front view of the shroud plate of FIG. 1.
Figure 3:
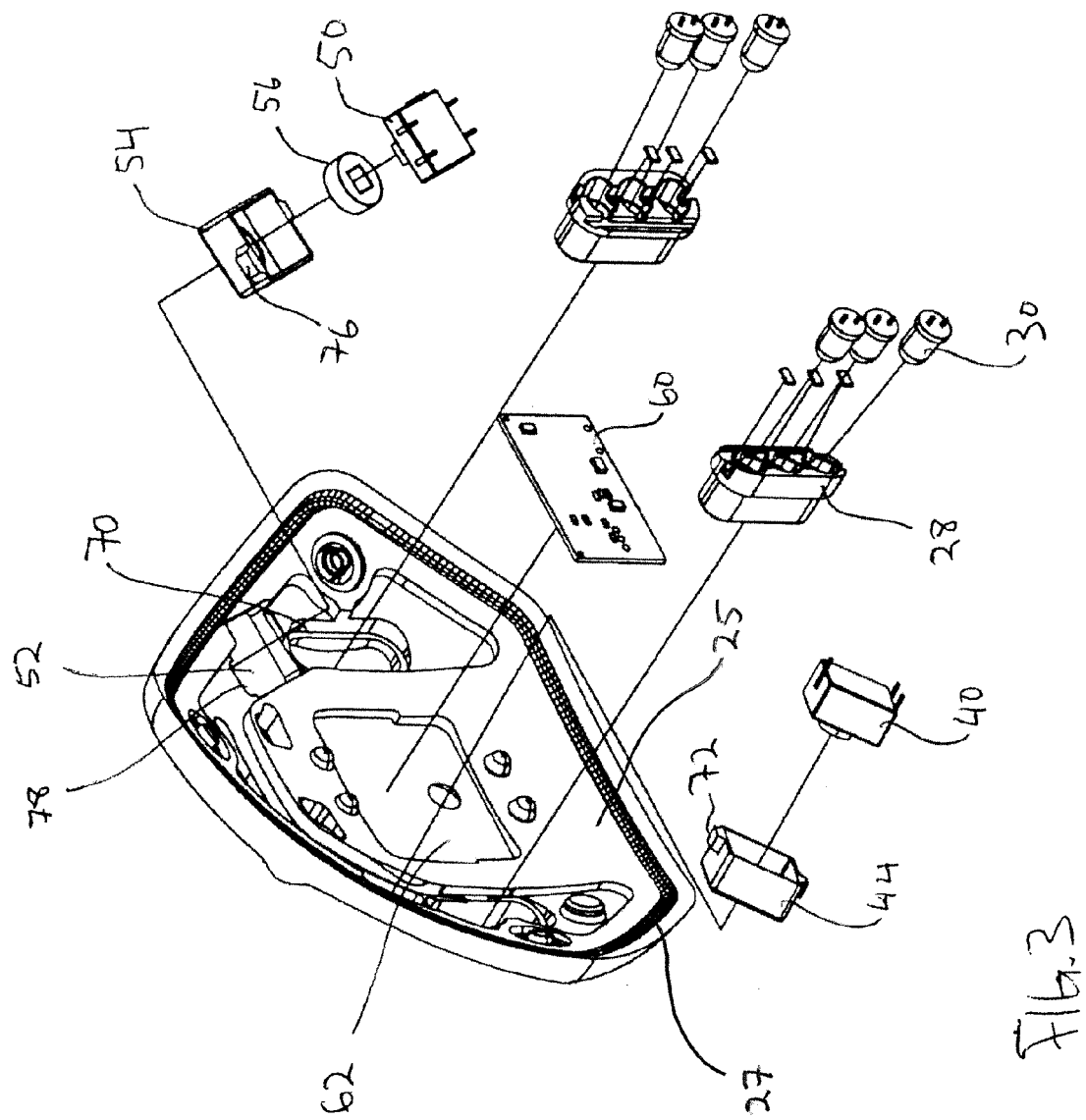
FIG. 3 is an exploded perspective rear view of the shroud plate of FIG. 1.

In one embodiment, with reference to FIGS. 1-3, the shroud plate 12 includes the shell 21 generally encompassing at least a portion of a night vision goggle mount receiving area 22. Additionally, the shell 21 has an external surface 23 that faces away from the headgear when the shroud plate 12 is attached to the headgear, a back surface 25 (FIG. 3) that faces toward the headgear when the shroud plate is attached to the headgear and a periphery. The external surface 23 is generally smooth with rounded edges and corners at the periphery. However, the "smooth" surface may be roughened to have a sandpaper feel and may include projections or protrusions, including those provided by a lighting system coupled to the shell 21, but not ones that could snag a shroud line or foliage and thereby injure a wearer of headgear on which the shroud plate 12 is mounted. Further, in one embodiment, the back surface 25 is shaped to match the contour of the headgear such that at least the periphery of the shell fits to the headgear and prevents an object from being snagged between the headgear and the shroud plate. In other words, in one embodiment there is substantially no space between a periphery of the shell 21 and the headgear 10.

With reference now also to FIGS. 2 and 3, the shell 21 includes a plurality of recessed openings 24 into which fasteners 26 for attaching the shroud plate to the headgear 10 are inserted, the openings being recessed sufficiently to prevent the fasteners 26 from protruding past the external surface of the shell. However, it will be appreciated that the shell 21 may also be attached by other configurations and fasteners, such as a single screw inserted through a center of the shroud plate.

The shell 21 also includes a night vision goggle mount receiving area 22 adapted to receive a night vision goggle mount for attaching night vision goggles to the shroud plate. The night vision goggle mount receiving area includes a bottom wall 90 having a recess 92, a top wall 94 having a recess and side walls 96 for securing the night vision goggle mount within the receiving area. As such, when the shroud plate 12 is attached to the headgear 10 and night vision goggles are attached to the shroud plate, a user is provided with a hands-free mount for night vision goggles. As noted above, in one embodiment the weight of the night vision goggles can be counter-balanced by a power unit 14 located on the back of the headgear generally opposite to the night vision goggles.

In one embodiment as shown in FIG. 1, the walls 90, 94, 96 are integral with and protrude from the external surface 23. As shown, the walls 90, 94, 96 have a curved exterior surface without any right angles that allows an object to slide over the walls 90, 94, 96 rather than be snagged by the walls. Additionally, although an interior surface of the walls 90, 94, 96 are substantially perpendicular to the night vision goggle mount receiving surface 22, the curved nature of the exterior surfaces and the relatively low profile of the walls substantially prevents an object from being snagged on the interior wall. In one embodiment, a height of the walls 90, 94, 96 measured from the night vision goggle mount receiving surface 22 to a top of each wall is about 0.2 inch.

The shroud plate 12 further includes a lighting system to provide a wearer with a light source for use with or without the night vision goggles. The lighting system generally includes one or more light housings 28 with one or more lights 30, a power and color select switch (referred to as a power switch) 40, a dimmer switch 50, and a control system 60, as described in more detail below. The shroud plate 12 provides a platform to which the lighting system can be mounted and also protects the lighting system.

As shown in the figures, an embodiment of the lighting system is generally incorporated within the shroud plate 12. The shroud plate 12, therefore, contains various cavities and recesses for accommodating the lighting system. Specifically, the shroud plate 12 includes two light housing cavities 32, a power switch cavity 42, a dimmer switch cavity 52, and a control system recess 62 (FIG. 3). As will be appreciated, the shroud plate 12 can be attached to the headgear 10 with or without the lighting system coupled thereto.

Each light housing 28 is adapted to house at least one light and also to direct light emitted from each light in a direction generally away from the headgear. In one embodiment, the lighting system includes two light housings, each light housing being adjacent to the night vision goggle mount receiving area 22 on the shell 21. Accordingly, the lighting system can be used simultaneously with night vision goggles attached to the shroud plate 12.

As shown in FIGS. 1-3, the light housing 28 is adapted to house three LEDs 30. More specifically, the light housing 28 includes three light passages 34 defined within the light housing, each light passage adapted to accommodate one LED 30. In one embodiment, the LEDs 30 are friction-fitted into each light passage 34 such that a light end of the LED is slightly recessed within the light passage 34 allowing the light passage to direct the light like a flashlight generally in a direction in which the light housing 28 faces. The LEDs within the housing may be configured to each emit a different color light or the same color light. To provide for a focused light pattern for maximum efficiency, 10 degree beam-width LEDs may be used. As will be appreciated, smaller LEDs or differently angled beam-width LEDs may also be used. In addition to the LEDs 30, a resistor 38 for each LED is housed in the light housing 28 to protect the LEDs in case of a power surge. In one embodiment, one light housing 28 may be located on either side of and generally adjacent to the night vision goggle mount receiving area 22 (FIG. 1). Further, the LEDs 30 can be angled together in unity to provide for a focused ball of light as opposed to four individual beams.

An outer surface of the light housing 28 is configured to be friction-fitted within the light housing cavity 32 on the shroud plate 12. More specifically, the light housing 28 is stepped to provide a flange 36 that is configured to engage a flange 70 on an inner wall of the light housing cavity 32 so that the light housing can be inserted into and protrude from the light housing cavity without sliding entirely through the light housing cavity. Although the light housings 28 may protrude from the external surface 23 of the shroud plate 12, they only protrude by about 0.18 inch and do not pose a snag hazard for the wearer. Additionally, a back or headgear-facing surface 25 (FIG. 3) of the light housing 28 is configured to generally conform to and be flush with a curvature of the headgear. More specifically, in one embodiment a periphery of the back surface 25 contacts the headgear 10 while a central region of the back surface may be spaced from the headgear to accommodate components, such as the lighting system, between the shroud plate 12 and the headgear.

Additionally, in another embodiment, an elastic lining 27, such as a rubber layer, may extend around or near the periphery of the back surface 25 to provide a cushion and to allow for a more secure fit of the shroud plate 12 to the headgear 10 and thereby reduce the likelihood of rotation of the shroud plate if, for example, only a single fastener is used to couple the shroud plate to the headgear.

As shown in FIG. 1, the shroud plate 12 includes two light housings 28 within two light housing cavities 32, each light housing containing three lights. However, it will be appreciated that the shroud plate 12 can include more or fewer light housings, each light housing containing more or fewer lights. Additionally, while the lights described herein are LEDs, other suitable lights may be used as well, such as visible infrared lights or non-visible infrared lights that are used to support the night vision goggle system in extreme low-light conditions.

The power switch 40 and the dimmer switch 50 will now be described in more detail. Generally, both of the switches 40, 50 protrude from the external surface 23 of the shroud plate 12 to allow easy access to a user. In one embodiment, the buttons protrude by about 0.15 inch and do not pose a snag hazard.

The power switch 40 is located in a power switch housing 44 adapted to fit within the power switch cavity 42. The power switch housing 44 is a generally square box having an open end into which the power switch 40 is insertable and a power button opening 48 through which a power button 46 protrudes when the power switch is in the power switch housing. In one embodiment, the power switch 40 is friction-fitted within the power switch housing 44.

An outer surface of the power switch housing 44 is configured to be friction-fitted within the power switch cavity 42 on the shroud plate 12. More specifically, the power switch housing 44 includes a plurality of protrusions 72 adapted to engage respective recesses in the power switch cavity 42. As such, the power switch housing 44 can be inserted into the power switch cavity 42 without sliding entirely through the power switch cavity. When the power switch 40 is in the power switch cavity 42 and electrically connected to the control system 60, the power button 46 protrudes from the power switch housing 44 and a user can turn the lighting system on and off. Additionally, the power switch 40 can be electrically configured to serve as a color select switch so that a user can turn on certain color lights 30 of the lighting system as desired. In one embodiment, the user can step through various color arrangement in series after the lighting system is turned on with the ultimate step in the series turning off the lighting system. It will be appreciated that rather than or in addition to a push button, a toggle switch, a dial or another activation mechanism may be used as the power switch.

The dimmer switch 50 is in a dimmer switch cavity 52 adapted to be located in a dimmer switch cavity 52 in the shroud plate 12. The dimmer switch housing 54 is a generally square box having an open end into which the dimmer switch 50 is insertable and a dimmer button opening 58 through which a dimmer button 56 protrudes when the dimmer switch is in the dimmer switch housing. In one embodiment, the dimmer switch 40 is friction-fitted within the dimmer switch housing 44.

An outer surface of the dimmer switch housing 54 is configured to be friction-fitted within the dimmer switch cavity 52 on the shroud plate 12. More specifically, the dimmer switch housing 54 includes a plurality of protrusions 76 adapted to engage respective recesses 78 in the dimmer switch cavity 52. As such, the dimmer switch housing 54 can be inserted into the dimmer switch cavity 52 without sliding entirely through the dimmer switch cavity. When the dimmer switch 50 is in the dimmer switch cavity 52 and electrically connected to the control system 60, the dimmer button 56 protrudes from the dimmer switch housing 54 and allows a user to gradually dim the lighting system over several stages. In one embodiment, the dimmer switch 50 can be programmed to default the lights 30 to the dimmest setting when the lighting system is turned on, and a user can step through various brightness settings by repeatedly pushing the dimmer button 56. Alternatively, the control system 60 can be programmed such that the lights can be dimmed by an infinite interval rather than being "stepped." It will be appreciated that rather than or in addition to a push button, a toggle switch, a dial, or another activation mechanism may be used as the power switch.

Although certain components of the lighting system described above include housings that are separate and detachable from the shroud plate 12, the housings may also be integral as a single component with the shroud plate. Additionally, the housings may also be attached to the shroud plate by an adhesive or other fasteners in addition to being friction fitted to the shroud plate.

As shown in FIG. 3, the control system 60, which in one embodiment may be a printed circuit board, is located in a control system recess 62 in the shroud plate and generally faces the headgear 10. The lights 30, power switch 40 and dimmer switch 50 are each electrically connected to the control system 60 which provides electrical power to the lighting system via the power unit 14.

The control system 60 may be programmed to allow various lighting configurations. For example, the control system may allow a user to set the lights to flash in a specific pattern and to allow a user to change the flash pattern when desired. As such, the lighting system may be used as an Identify Friend or Foe (IFF) device that allows identification of a headgear wearer as an ally or an enemy. Additionally, as described above, the control system 60 may be programmed to allow dimming of the lights, use of only some of the lights, and the ability to switch between use of different kinds of lights, such as infrared lights and LEDs.

In one embodiment, the control system 60 may be programmed such that the power switch 40 must be depressed for a set period of time, for example, three seconds, in order to actuate the lights either on or off. Additionally, the control system 60 may be programmed such that the power switch 40 can cycle through different modes by a tap of a set period of time, such as quarter second.

Figure 4:
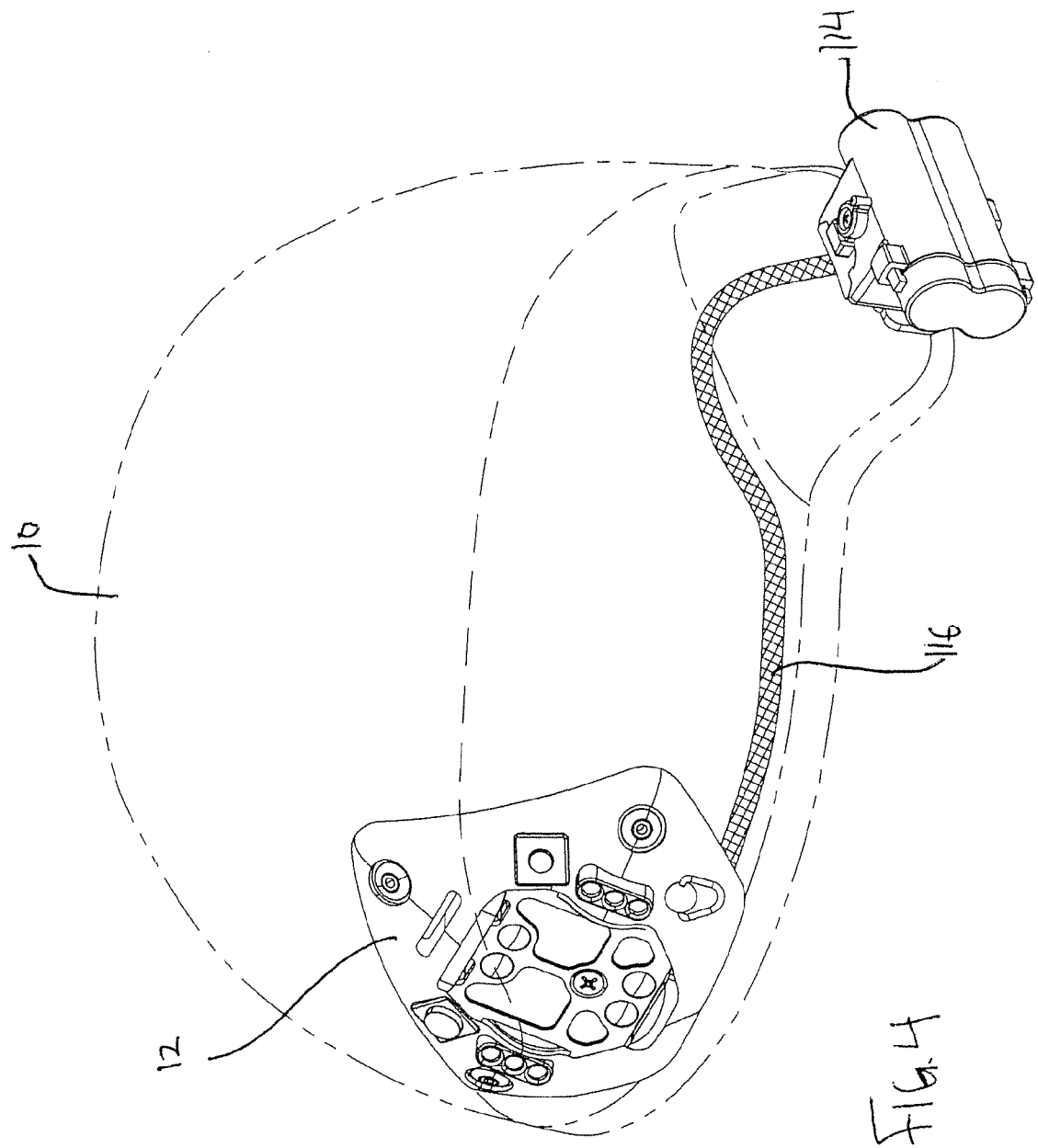
FIG. 4 is a perspective view of a shroud plate having a lighting system according to an alternate embodiment of the present invention.

With reference now to FIG. 4, an alternative embodiment of the lighting system is shown wherein a power unit 114 is attached on a side of the headgear 10. The power unit 114, which in one embodiment is a battery pack, may be attached by a bracket to the portion of the headgear 10 that protects a wearer's ear. Similarly to the previously described embodiments, a cable 116 may be attached to the power unit 114 and extend along an interior of the headgear 10 from the power unit to the shroud plate 12 to electrically connect the power unit and the lighting system. As will be appreciated, the power unit 114 may be located anywhere on the headgear or remote from the headgear, such as attached to a user's body, to provide power to the lighting system. Further, the power unit may be wirelessly connected to the lighting system to provide power thereto.

Figure 5:
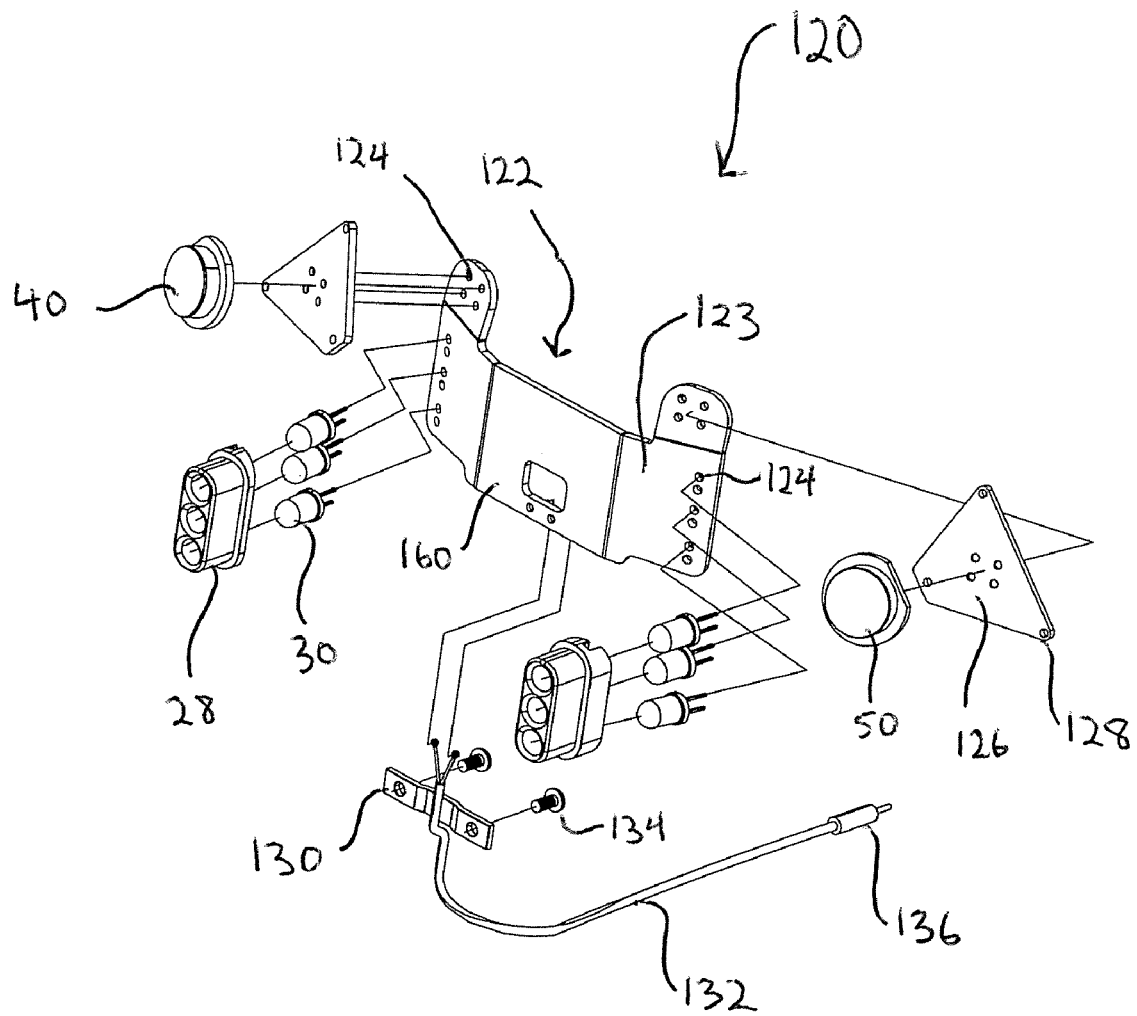
FIG. 5 is an exploded view of a lighting system according to an alternate embodiment of the present invention.
Figure 6:
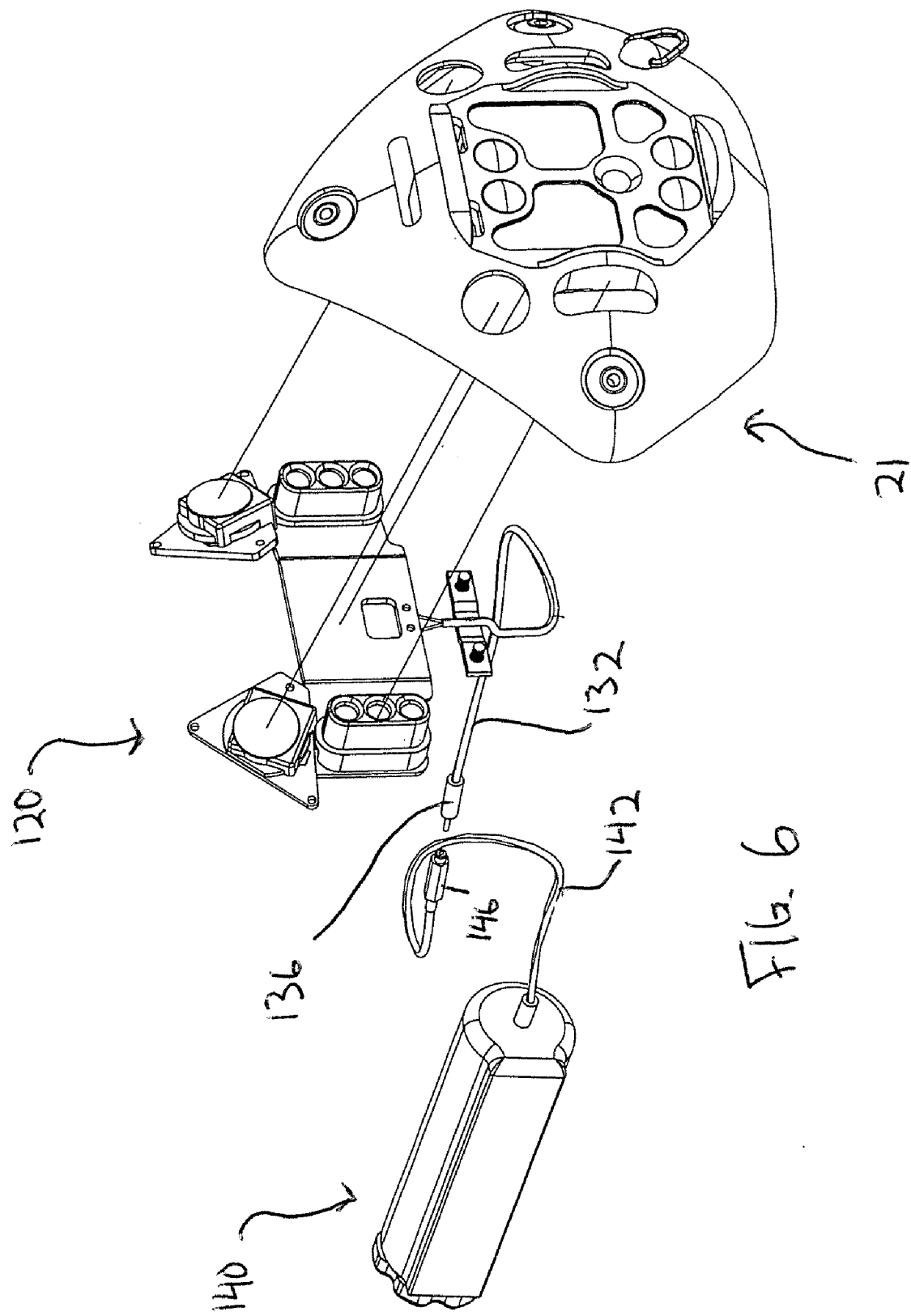
FIG. 6 is a partially exploded view of a modular lighting system according to yet another embodiment of the present invention.

With reference now to FIGS. 5 and 6, another embodiment of the present invention is a modular system including the shell 21, a lighting system 120 and a battery pack 140 as single modular units (i.e., separable components) that can be assembled together for use and disassembled easily to be stored separately, as necessary. Additionally, the lighting system 120 and the battery pack 140, in one embodiment, are waterproof up to about 70 feet. Further, in one embodiment, the lighting system 120 coupled to the shell 21 by an interference fit or by a snap fit to allow the lighting system to be easily detached from the shell 21. However, the method of coupling the components is not limited thereto and the components couple also be coupled by a fastener, such as a screw, bolt or a rivet, or other similar fasteners. The shell 21 is described above and therefore the description of the shell will not be repeated with respect to the present embodiment.

The lighting system 120 includes some components, such at the power switch 40, the dimmer switch 50 and the lights 30 and their housings 28 that are substantially similar to those previously described and as such the present description will focus primarily on the differences.

The lighting system 120 is assembled together to be a stand-alone component adapted to be coupled to the shroud plate 12 to provide lighting capability. The lighting system includes a support plate 122 that generally serves to accommodate the lighting system components that include lights 30 and light housings 28 as described above. The support plate 122 includes a control system 160 for the lighting system 120, which may be a circuit board as well as cavities or openings 124 adapted to allow various components to be coupled thereto, and side panels 123 configured to accommodate light housings 28, lights 30 and switches 40, 50. The support plate 122 is shaped and dimensioned so that the components coupled to it fit through respective openings in the shroud plate 12 as shown in FIG. 6.

A backing plate 126 is located between the support plate 122 and each of the power switch 40 and the dimmer switch 50 to provide additional area and support structure to the support plate 122. Each backing plate 126 includes fastener openings 128 configured to receive a fastener such as a bolt, screw or rivet to attach the backing plate to the headgear 10. In one embodiment, the mount plates 126 have a generally triangular shape, but the shape of the backing plate is not limited thereto.

Power is provided to the lighting system 120 by the battery pack 140 electrically coupled to the lighting system by a cord 132. The cord 132 is coupled to the control system 160 at one end and is removably coupled to a cord 142 of the battery pack at another end. A portion of the cord 132 is maintained in place proximate an interior surface of the head gear 10 by a mount plate 130 attached to the headgear 10 by fasteners 134, such as screws, bolts or rivets and having a configuration adapted to cover a portion of the cord. One end of the cord 132 is a male plug 136 adapted to be inserted into a female plug 144 of the battery pack 140. Further, the battery case may be dimensioned to accommodate a plurality of batteries.

Figure 7:
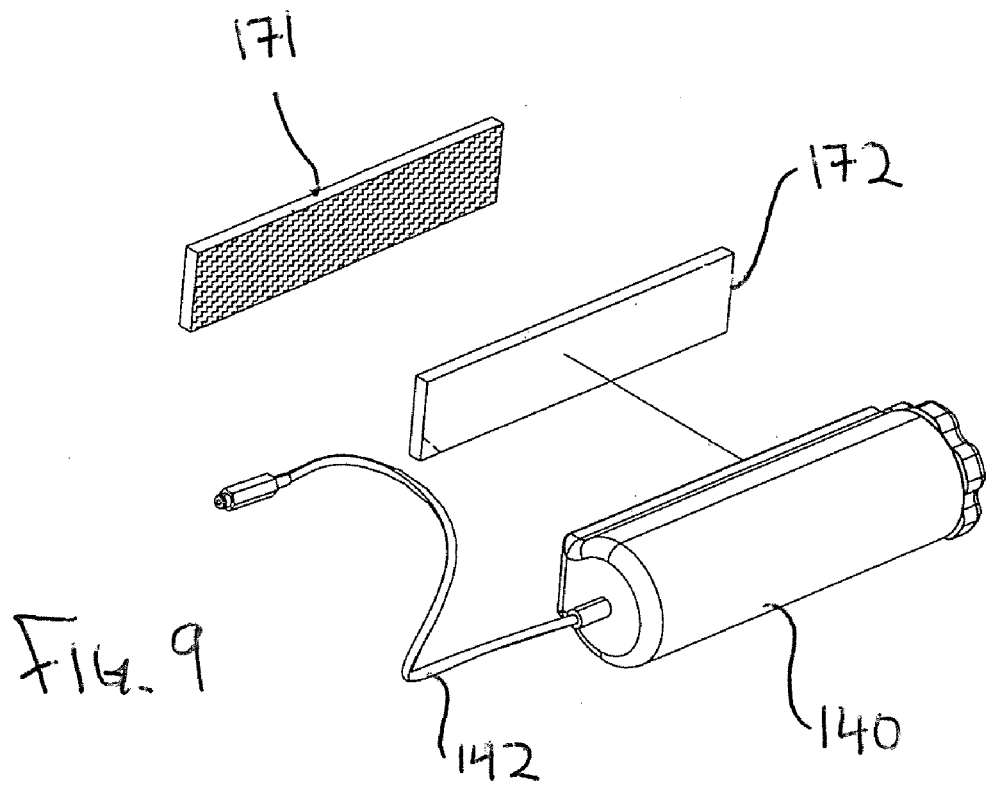
FIGS. 7 and 8 are cross-sectional views of a battery pack according to an embodiment of the present invention.
Figure 8:
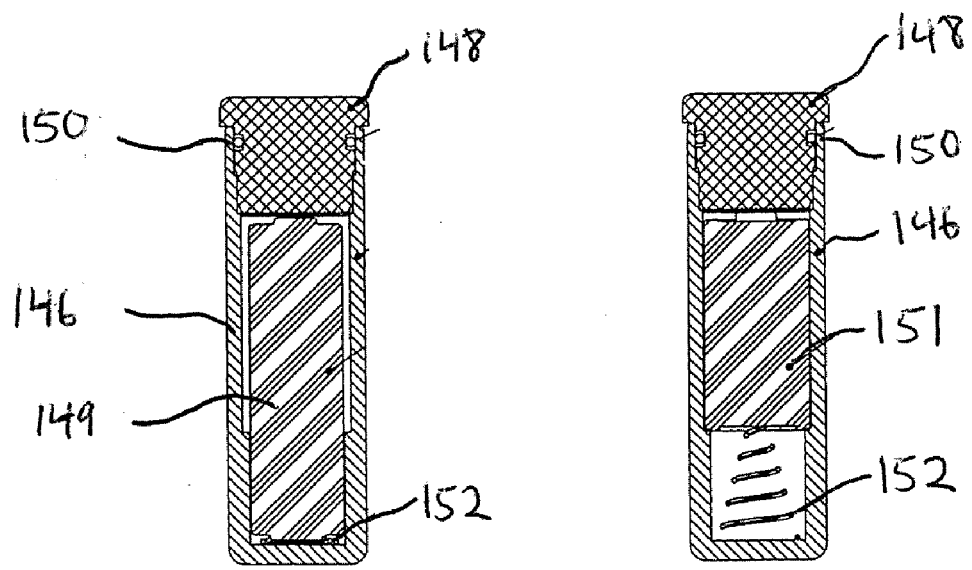

With reference now also to FIGS. 7-9, the battery pack 140 includes a case 146 having an open top and configured to house a battery. The battery pack 140 also includes a cap 148 configured to seal the case 146 and a seal 150, such as a rubber O-ring, between the case 146 and the cap 148 that reduces the likelihood that moisture will enter the case up to a depth of about 70 feet. A conical coil spring 152 is located between a lower wall of the case 146 and a battery 150 to provide an electrical connection for batteries of different lengths. More specifically, the coil spring 152 allows an electrical connection to be maintained whether a battery 150, such as a AA alkaline battery, having a length substantially equal to a length of an interior portion the case 146 (FIG. 7) or a battery 151, such as an SF123A battery, having a length less than the length of the interior portion of the case (FIG. 8) is inserted into the case.

With reference now to FIG. 9, the battery pack 140 includes the cord 142 extending therefrom and having the female plug 144 configured to be coupled to the male plug 136 to electrically couple the battery pack to the lighting system 120 and to provide power thereto.

In embodiments, the battery pack 140 may be removably attached to the headgear 10 in a variety of ways and in a variety of locations on the headgear. With continued reference to FIG. 9, a hook and loop system, such as VELCRO®, may be used. More specifically, a first strip may be bonded or otherwise coupled to the headgear 10 and a second strip may be bonded or otherwise coupled to the battery pack 140, thereby allowing the battery pack to be coupled and uncoupled to the headgear. The hook and loop fasteners may be coupled at any suitable location on the headgear 10 and the length of the cords 132, 142 can be customized to correspond to the location of the battery pack 140.

Figure 10:
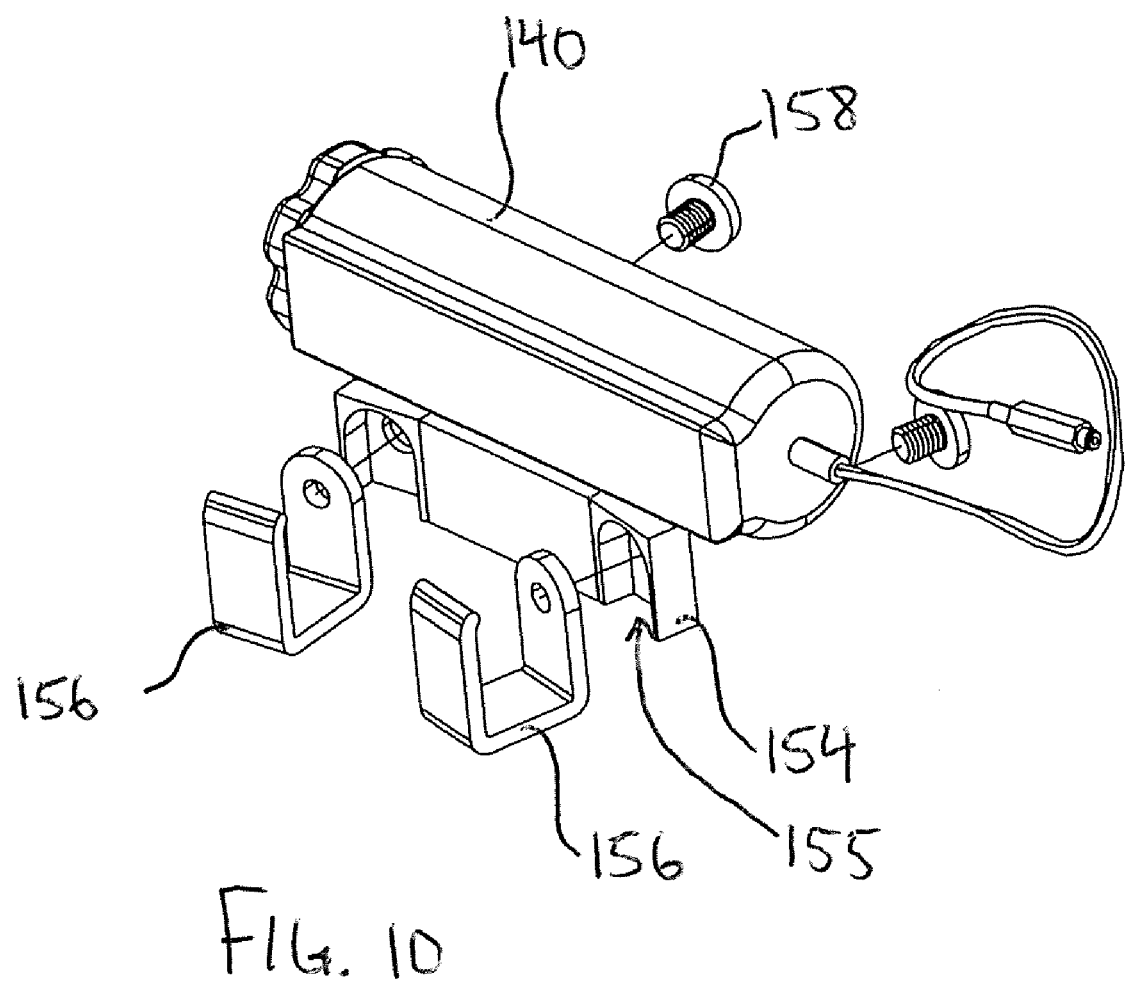
FIG. 10 is a perspective view of a fastening system for a battery pack according to another embodiment of the present invention.

In another embodiment, with reference to FIG. 10, the battery pack 140 includes a mount 154 coupled thereto and a pair of clips 156 coupled to the mount 154 by fasteners 158, such as screws, bolts or rivets. The clips 156 are dimensioned to fit around a brim 11 of the headgear 10 (FIG. 1) to couple the battery pack 140 to the headgear. The mount 154 includes recesses 155 that allow the clips 156 to be adjusted with respect to the battery pack 140 to be clipped to differently sized brims.

Figure 11:
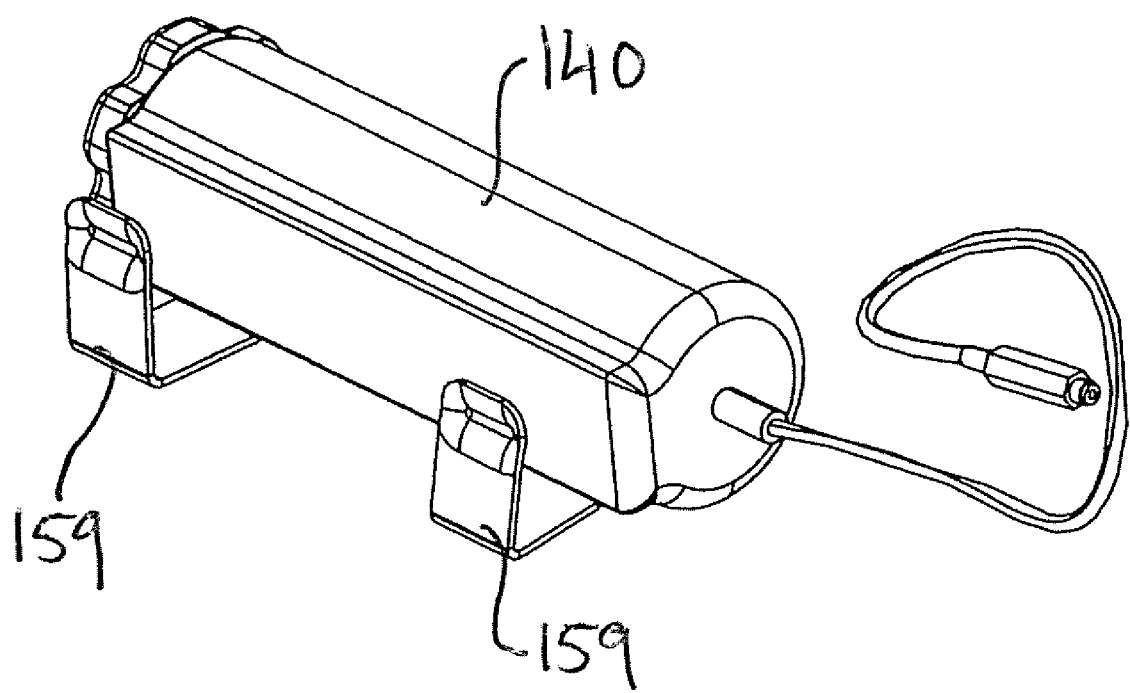
FIG. 11 is a perspective view of a fastening system for a battery pack according to yet another embodiment of the present invention.

In yet another embodiment, with reference to FIG. 11, the battery pack 140 includes a pair of spring clips 159 that can be clipped around the brim 11 of the headgear 10 to couple the battery pack to the headgear.

Although embodiments of the present invention have been described, it will be appreciated by those of skill in the art that various modifications may be made to the described embodiments that fall within the scope and spirit of the invention.

What is claimed is:

1. A light for headgear comprising:
    a shroud plate comprising:
       a shell configured to receive a goggle mount, the shell having an inner-facing surface and an outer-facing surface and a periphery generally conforming to a contour of the headgear; and
       a lighting system on the shell comprising at least one light, wherein the lighting system extends from the inner surface to the outer surface of the shell; and
    a power unit electrically coupled to the lighting system.

2. The light of claim 1, wherein the shroud plate has a smooth external surface.

3. The light of claim 1, wherein the shell is a single unit and the lighting system is a single unit, and wherein the lighting system is removably coupled to the shell.

4. The light of claim 3, wherein the power unit is removably coupled to the shroud plate.

5. The light of claim 1, wherein the lighting system further comprises:
    a support plate comprising a control system for controlling the lighting system; and
    at least one light housing accommodating the at least one light and coupled to the support plate.

6. The light of claim 5, wherein the lighting system further comprises a power switch mounted on the support plate and electrically coupled to the control system for turning the lighting system on and off.

7. The light of claim 5, wherein the lighting system further comprises a dimming switch mounted on the support plate and electrically coupled to the control system for controlling an intensity of light emitted from the lighting system.

8. A light for headgear comprising:
    a shroud plate comprising:
       a shell configured to receive a goggle mount, the shell having an inner-facing surface and an outer-facing surface and a periphery generally conforming to a contour of the headgear; and
       a lighting system on the shell comprising at least one light, wherein the lighting system extends from the inner surface to the outer surface of the shell; and
    a power unit electrically coupled to the lighting system, wherein the shell has a plurality of openings, each of the openings configured to receive a portion of the lighting system.

9. The light of claim 1, wherein the lighting system is coupled to the shell by an interference fit.

10. The light of claim 1, wherein the shell has a goggle mount receiving area defined by a first wall having a recess and a second wall having a recess.

11. The light of claim 1, wherein the inner-facing surface generally faces the headgear and wherein the inner-facing surface has an elastic lining configured to contact the headgear.

12. The light of claim 1, wherein the power unit comprises a battery pack.

13. The light of claim 12, wherein the battery pack comprises a case, a cover for the case, and a conical coil spring within the case.

14. The light of claim 12, wherein the power unit further comprises a mount configured to couple the power unit to the headgear.

15. The light of claim 14, wherein the mount comprises a clip configured to fit around a brim of the headgear.

16. A light for headgear comprising:
    a shroud plate comprising:
       a shell configured to receive a goggle mount, the shell having a periphery generally conforming to a contour of the headgear; and
       a lighting system on the shell comprising at least one light, wherein the shell is a single unit and the lighting system is a single unit, and wherein the lighting system is removably coupled to the shell, and wherein the shell has a plurality of openings, each of the openings configured to receive a portion of the lighting system; and
    a power unit electrically coupled to the lighting system.

17. A light for headgear comprising:
    a shroud plate comprising:
       a shell configured to receive a goggle mount in a goggle mount receiving area, the goggle mount receiving area comprising a first wall having a recess and a second wall generally opposite the first wall and having a recess; and
       a lighting system on the shell comprising a light; and
    a power unit electrically coupled to the lighting system.

18. The light of claim 17, wherein the light is adjacent the goggle mount receiving area.

19. The light of claim 18, comprising an additional light, wherein the light is adjacent to a first side of the goggle mount receiving area and the additional light is adjacent to a second side of the goggle mount receiving area.

20. The light of claim 17, further comprising at least one light housing accommodating the at least one light, the light housing configured to direct light emitted from the at least one light in a direction substantially away from the headgear.

* * * * *